United States Patent
Matsui et al.

(10) Patent No.: US 8,203,826 B2
(45) Date of Patent: Jun. 19, 2012

(54) LITHIUM ION CAPACITOR

(75) Inventors: Kohei Matsui, Hiroshima (JP); Atsuro Shirakami, Tokyo (JP); Nobuo Ando, Tokyo (JP); Shinichi Tasaki, Yokohama (JP); Risa Miyagawa, Tokyo (JP); Osamu Hatozaki, Tokyo (JP); Yukinori Hato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 374 days.

(21) Appl. No.: 12/090,461

(22) PCT Filed: Dec. 7, 2006

(86) PCT No.: PCT/JP2006/324462
§ 371 (c)(1),
(2), (4) Date: Apr. 16, 2008

(87) PCT Pub. No.: WO2007/066728
PCT Pub. Date: Jun. 14, 2007

(65) Prior Publication Data
US 2009/0161296 A1  Jun. 25, 2009

(30) Foreign Application Priority Data

Dec. 8, 2005  (JP) ................................. 2005-355409

(51) Int. Cl.
*H01G 9/00* (2006.01)
(52) U.S. Cl. ........................................ 361/502; 361/503
(58) Field of Classification Search .................. 361/502, 361/503
See application file for complete search history.

(56) References Cited

U.S. PATENT DOCUMENTS

| | | | |
|---|---|---|---|
| 2004/0179328 A1* | 9/2004 | Ando et al. | .................... 361/504 |
| 2007/0002523 A1 | 1/2007 | Ando et al. | |

FOREIGN PATENT DOCUMENTS

| | | | |
|---|---|---|---|
| EP | 1670008 A1 | * | 6/2006 |
| JP | 8-107048 | | 4/1996 |
| WO | 03/003395 | | 1/2003 |
| WO | 2004/097867 A2 | | 11/2004 |
| WO | 2005/031773 | | 4/2005 |

(Continued)

OTHER PUBLICATIONS

International Search Report (English & Japanese) for PCT/JP2006/324462 mailed Mar. 6, 2007 (7 pages).

(Continued)

*Primary Examiner* — Eric Thomas
(74) *Attorney, Agent, or Firm* — Osha • Liang LLP (57) ABSTRACT

A lithium ion capacitor includes a positive electrode, a negative electrode, and a non-protonic organic solvent electrolytic solution of a lithium salt. A positive electrode active material is a material capable of reversibly doping a lithium ion and/or an anion. A negative electrode active material is a material capable of reversibly doping a lithium ion. The lithium ion is doped in advance to either one or both of the negative electrode and the positive electrode so that a positive electrode potential after the positive electrode and the negative electrode are short-circuited is 2.0 V (relative to $Li/Li^+$) or less when capacitance per unit weight of the positive electrode is $C_+(F/g)$, weight of the positive electrode active material is $W_+(g)$, capacitance per unit weight of negative electrode is $C_-(F/g)$, and weight of the negative electrode active material is $W_-(g)$, a value of $(C_- \times W_-)/(C_+ \times W_+)$ is 5 or more.

4 Claims, 2 Drawing Sheets

FOREIGN PATENT DOCUMENTS

WO    2006/112067    10/2006

OTHER PUBLICATIONS

Written Opinion (Japanese only) for PCT/JP2006/324462 mailed Mar. 6, 2007 (3 pages).

esp@cenet Patent Abstract for WO2005031773 dated Apr. 7, 2005 (2 pages).

esp@cenet Patent Abstract for WO03003395 dated Jan. 9, 2003 (1 page).

esp@cenet Patent Abstract for WO2006112067 dated Oct. 26, 2006 (2 pages).

esp@cenet Patent Abstract for JP8107048 dated Apr. 23, 1996 (1 page).

esp@cenet Patent Abstract for WO2004/097867, Publication Date Nov. 11, 2004 (1 page).

Office Action in Japanese Application No. 2005-355409; Mailed Jan. 28, 2011 (2 pages)).

\* cited by examiner

LITHIUM ION CAPACITOR

TECHNICAL FIELD

The present invention relates to a lithium ion capacitor that is high in the energy density, output density and capacity and long in the lifetime.

BACKGROUND ART

In recent years, as an electric storage device that responds to applications that necessitate the high energy density and high output characteristics, an electric storage device called a hybrid capacitor that combines electric storage principles of a lithium ion secondary battery and an electric double layer capacitor is gathering attention. As one of such electric storage devices, an organic electrolyte capacitor is proposed in which in a carbon material that can store and release lithium ion, lithium ion is electrochemically stored, carried (herein after, in some cases, referred to as doping) in advance to lower a negative electrode potential, and, thereby, the energy density can be largely increased (Patent literature No. 1).

In this kind of organic electrolyte capacitor, high performance can be expected. However, when the lithium ion is doped in advance to a negative electrode, there are problems in that the doping takes a very long time and cannot be uniformly applied over an entire negative electrode. Accordingly, it has been considered difficult to put the organic electrolyte capacitor into practical use in a large and high capacity cell such as, in particular, a cylindrical device where electrodes are wound or a rectangular capacitor where a plurality of sheets of electrode is laminated.

However, as a method of overcoming such problems, an organic electrolyte capacitor in which a positive electrode current collector and a negative electrode current collector, respectively, have a hole penetrating through front and back surfaces, a negative electrode active material can reversibly carry lithium ion and, when metal lithium is disposed facing a negative electrode or positive electrode, the lithium ion can be electrochemically carried by the negative electrode is proposed (Patent literature 2).

In the organic electrolyte capacitor, when an electrode current collector is provided with a hole penetrating through front and back surfaces thereof, lithium ion can move between front and back surfaces of an electrode without being interrupted by the electrode current collector; accordingly, even in an electric storage device having a cell configuration many in the number of laminated sheets, through the through hole, the lithium ion can be electrochemically doped to a negative electrode disposed not only in the neighborhood of metal lithium but also to a negative electrode disposed far apart from the metal lithium.

Patent literature 1: JP-A-08-107048 (page 2, second column, 38 through 47 line)

Patent literature 2: WO03/003395A1

In an existing lithium ion capacitor, when such an electrode current collector provided with a hole penetrating through front and back surfaces is adopted, while a time for doping the lithium ion to the negative electrode can be drastically cut, the cell lifetime cannot be fully satisfied. For instance, in a typical lithium ion capacitor, the capacity deteriorates when 2000 hr has elapsed under an atmospheric temperature of 60° C. and a cell voltage of 3.6 V to substantially 80% or less relative to the initial capacity. That is, the cell lifetime is shortened.

DISCLOSURE OF THE INVENTION

The invention overcomes such problems and intends to make the lifetime of a lithium ion capacitor having high energy density, output density and capacity longer.

In order to overcome the problems, the inventors considered that, in an existing lithium ion capacitor, since, by weighing the cell capacity heavily, a weight ratio of the negative electrode is made as small as possible, as the cell is used repeatedly, the cell capacitance deteriorates to be incapable of obtaining desired performance. There, by varying a weight ratio of a positive electrode and a negative electrode of the lithium ion capacitor and a capacity ratio per unit weight thereof to make a capacity balance of both electrodes appropriate, it was found that the capacity retention rate of the cell could be improved. Thereby, the present invention came to completion.

(1) According to one or more embodiments of the invention, a lithium ion capacitor is provided with a positive electrode, a negative electrode, and a non-protonic organic solvent electrolytic solution of a lithium salt as an electrolytic solution. A positive electrode active material is a material that can reversibly dope lithium ion and/or anion. A negative electrode active material is a material that can reversibly dope lithium ion. The lithium ion is doped in advance to a negative electrode and/or a positive electrode so that a positive electrode potential after the positive electrode and the negative electrode are short-circuited may be 2.0 V (versus $Li/Li^+$) or less. When the capacitance per unit weight of positive electrode, weight of the positive electrode active material, capacitance per unit weight of negative electrode and weight of the negative electrode active material, respectively, are taken $C_+(F/g)$, $W_+(g)$, $C_-(F/g)$ and $W_-(g)$, a value of $(C_- \times W_-)/(C_+ \times W_+)$ is 5 or more.

(2) Furthermore, in the lithium ion capacitor according to the (1), the value of $(C_- \times W_-)/(C_+ \times W_+)$ may be 10 or more.

(3) Still furthermore, in the lithium ion capacitor according to the (1) or (2), the positive electrode and/or the negative electrode, respectively, are provided with a current collector having a hole penetrating through front and back surfaces and, owing to an electrochemical contact of the negative electrode and a lithium ion supply source, lithium ion may be doped to the negative electrode.

(4) In the lithium ion capacitor according to any one of the (1) through (3), the negative electrode active material has the capacitance per unit weight three-times or more that of the positive electrode active material and the weight of the positive electrode active material may be larger than that of the negative electrode active material.

According to one or more embodiments of the invention, as mentioned above, when a weight ratio of the positive electrode and the negative electrode of the lithium ion capacitor and a capacitance ratio per unit weight are made appropriate to make the capacitance of the negative electrode 5 times or more that of the positive electrode, the capacitance of the cell can be made less in a decrease with time; accordingly, the cell can be made longer in the lifetime thereof.

Other aspects and advantages of the invention will be apparent from the following description and the appended claims.

DESCRIPTION OF REFERENCE NUMERALS AND SIGNS

1: positive electrode
1a: positive electrode current collector

2: negative electrode
2a: negative electrode current collector
3: separator
4: metal lithium (lithium ion supply source)
4a: lithium electrode current collector
5: exterior case
6: electrode-laminated unit
7: electrode winding unit
8, 9, 10: output port
11: positive electrode connection terminal
12: negative electrode connection terminal

BEST MODE FOR CARRYING OUT THE INVENTION

Figure 1:
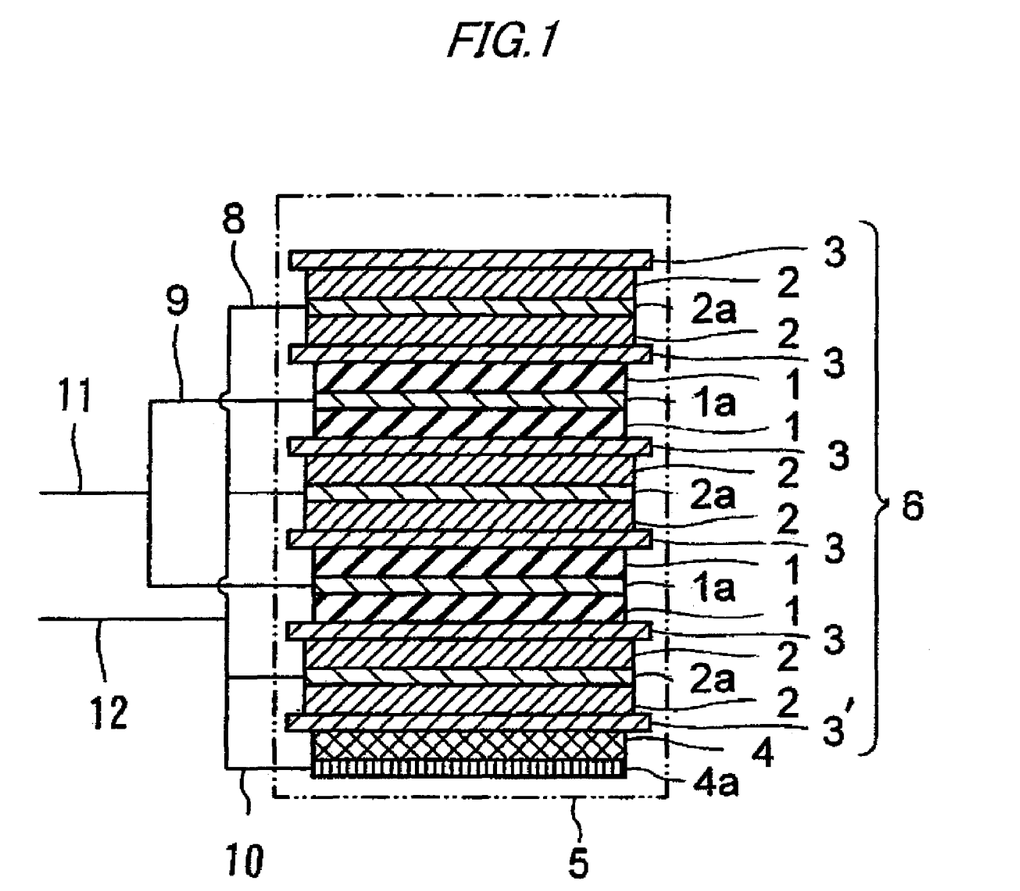
FIG. 1 is a schematic sectional view of a rectangular lithium ion capacitor of an exemplary embodiment of the invention.

In the next place, an exemplary embodiment of a lithium ion capacitor of the invention will be described with reference to the drawings. However, the invention is not restricted thereto. FIG. 1 is a sectional view of a rectangular cell that is a typical one of lithium ion capacitors (hereinafter, referred to as LIC or cell) involving the invention.

In the example, a cell is constituted, as shown in FIG. 1, in such a manner that a positive electrode 1 and a negative electrode 2 are alternately laminated through a separator 3 to form an electrode-laminated unit 6, at this time, preferably, the electrode-laminated unit 6 is formed so that the outermost portion thereof may be a negative electrode 2, at for instance a lower portion of the electrode-laminated unit 6 metal lithium 4 as a lithium ion supply source is disposed opposite to the positive electrode 1 and negative electrode 2, and these are housed in an exterior case 5. Each of the laminated positive electrodes 1 is connected through an output port 9 to a positive electrode connection terminal 11 and each of the negative electrodes 2 and metal lithium 4 is connected through each of an output port 8 and an output port 10 to a negative electrode connection terminal 12. In the example, the positive electrode connection terminal 11 and the negative electrode connection terminal 12 are disposed on the same side of the cell (left side in FIG. 1); however, positions of the connection terminals can be appropriately changed, for instance, these may be divided and disposed on both sides.

In thus configured cell, an electrolytic solution (electrolyte) in which lithium ion can move is poured and sealed and left in this state for a predetermined time period (for instance, 10 days). At this time, since the metal lithium 4 and the negative electrode 2 are short-circuited, the lithium ion can be doped in advance to the negative electrode 2. In the invention, "the positive electrode" means an electrode on a side from which a current flows out at the discharge and in which current flows at the charging and "the negative electrode" means an electrode on a side in which a current flows at the discharge and from which current flows out at the charging.

In the invention, the doping means inserting, carrying, adsorbing or storing and a phenomenon where lithium ion and/or anion enter an active material.

In the example, two layers of positive electrode (the number of layers of the active material is 4) and three layers of negative electrode (the number of layers of the active material is 6), that is, 5 layers in total form a cell. However, the number of layers of the positive electrode and negative electrode assembled in a cell is appropriately determined depending on the kind of the cell and the number of layers of the metal lithium disposed in the cell. Accordingly, without particularly specifying, in a rectangular cell, usually, substantially 10 to 20 layers are preferred. Furthermore, in FIG. 1, the electrode-laminated unit 6 is housed in an exterior case 5 in a lateral direction (horizontal direction). However, the electrode-laminated unit 6 may be housed in the external case 5 in a longitudinal direction.

In the cell, as the metal lithium 4 that is a lithium ion supply source disposed to the electrode-laminated unit 6, one in which a metal lithium foil and a current collector 4a are pressure bonded and integrated can be preferably used. Specifically, a metal lithium foil pressure bonded to a current collector is cut in accordance with the electrode-laminated unit 6 and the cut metal lithium foil is disposed faced to the electrode-laminated unit 6 with a current collector side disposed outside.

The positive electrode 1 and negative electrode 2 that constitute the electrode-laminated unit 6, respectively, as shown in FIG. 1, are preferably formed on both surfaces of the positive electrode current collector 1a and the negative electrode current collector 2a as a positive electrode active material layer and a negative electrode active material layer (in the drawing, the positive electrode active material layer and negative electrode active material layer, respectively, are shown as the positive electrode 1 and negative electrode 2). When the positive electrode current collector 1a and negative electrode current collector 2a are made of a porous material provided with a hole penetrating through front and back surfaces and thus the negative electrode current collector 2a and the positive electrode current collector 1a are made porous, even when the metal lithium 4 is disposed at the outermost portion of the electrode-laminated unit 6 as shown for instance in FIG. 1, the lithium ion can freely move between the respective electrodes from the metal lithium 4 through through holes of the respective current collectors; accordingly, the lithium ion can be doped to all the negative electrodes 2 of the electrode-laminated unit 6.

In a laminated film type cell not shown in the drawing, except for an exterior case, a cell configuration is substantially same as that of the rectangular cell.

Figure 2:
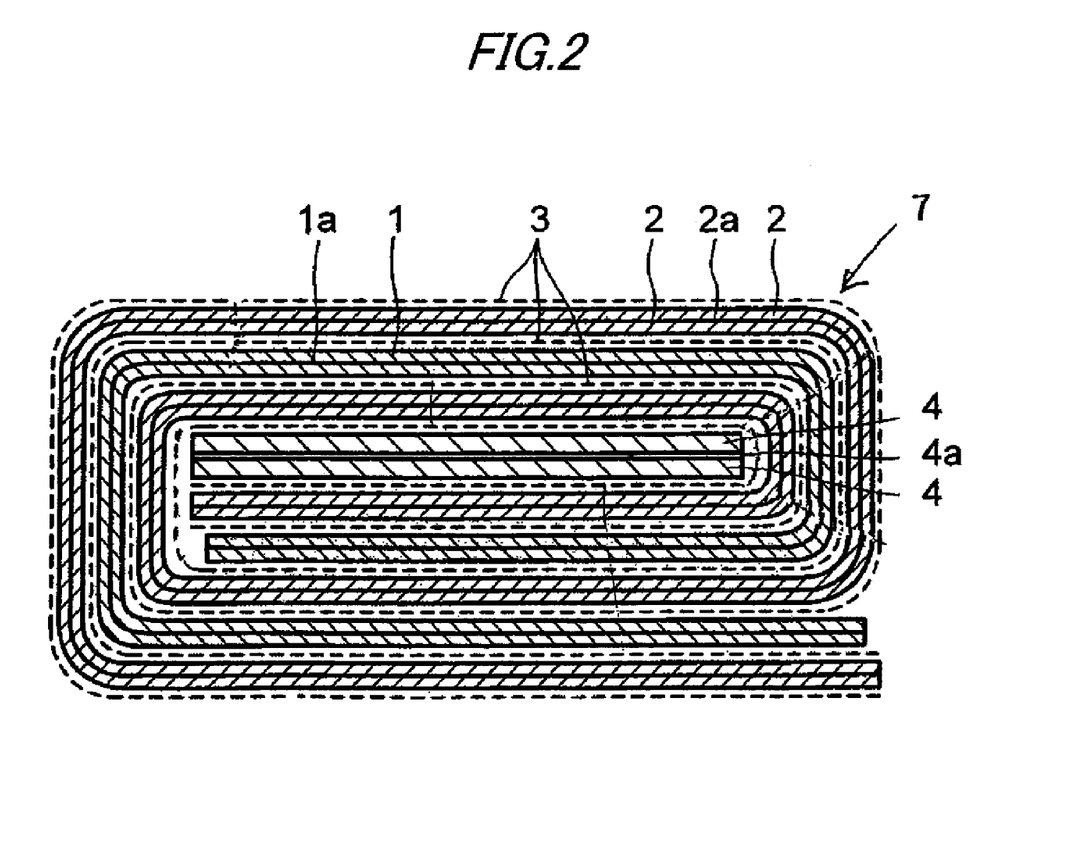
FIG. 2 is a schematic sectional view of a winding type lithium ion capacitor involving another exemplary embodiment of the invention.

FIG. 2 is a sectional view of a winding type lithium ion capacitor that is another exemplary embodiment of the invention. Members same as that of the rectangular cell will be described provided with same reference numerals and marks. In the example, a belt-like positive electrode 1 and negative electrode 2 are wound with a separator 3 interposed there between to form a flat cylindrical electrode-winding unit 7 preferably with a separator 3 disposed at the outermost portion and with a negative electrode 2 disposed inside thereof, metal lithium 4 is disposed at for instance a core portion of the electrode-winding unit 7, and thereby a cell is formed. In FIG. 2, the positive electrode 1 is formed as positive electrode active material layers on both sides of a belt-like positive electrode current collector 1a and the negative electrode 2 is formed as negative electrode active material layers on both sides of a belt-like negative electrode current collector 2a. As the metal lithium 4, one in which a metal lithium foil is pressure bonded on both surfaces of a porous current collector 4a is preferred.

In the cell structure, the positive electrode current collector 1a and negative electrode current collector 2a are formed of a porous material same as the laminate type. When the metal lithium 4 is short-circuited with the negative electrode 2, from the metal lithium 4 disposed at a core portion, lithium ion move through hole portions of the both current collectors and thereby a predetermined amount of lithium ion is doped to the negative electrode 2 of the electrode-winding unit 7.

Though not shown in the drawing, metal lithium may be disposed at an outer periphery portion of an electrode-winding unit 7 to allow lithium ion moving from an external side of the electrode-winding unit 7 to a center portion thereof to dope or the metal lithium may be disposed at both of a center portion and an outer periphery portion of the electrode-winding unit 7 to allow doping lithium ion from both of internal and external sides of the electrode-winding unit 7. Furthermore, to a cylindrical electrode-winding unit formed by circularly winding a positive electrode and a negative electrode through a separator, the metal lithium can be similarly disposed.

The LIC according to the invention includes a positive electrode made of a material capable of reversibly doping lithium ion and/or anion and a negative electrode made of a material capable of reversibly doping lithium ion, and has a non-protonic organic electrolytic solution of a lithium salt as an electrolytic solution. In a preferable LIC of the invention, a positive electrode potential after the positive electrode and the negative electrode are short-circuited is 2.0 V (relative to Li/Li$^+$) or less.

In a conventional electric double layer capacitor, usually, in a positive electrode and a negative electrode, same active material (mainly activated charcoal) is used by a substantially same amount. The active material has a potential of substantially 3 V when a cell is assembled and, when a capacitor is charged, while anion forms an electric double layer on a positive electrode surface to raise a positive electrode potential, cation forms an electric double layer on a negative electrode surface to lower a potential. By contrast, when a cell is discharged, anion and cation, respectively, are released from the positive electrode and the negative electrode into an electrolytic solution to lower and raise the potentials respectively to the proximity of 3 V. Thus, an ordinary carbon material has a potential of substantially 3 V; accordingly, an organic electrolyte capacitor in which both the positive electrode and the negative electrode use the carbon material becomes substantially 3 V in both of the positive electrode and negative electrode potentials after the positive electrode and the negative electrode are short-circuited.

On the other hand, in a preferable LIC of the invention, as mentioned above, a positive electrode potential after the positive electrode and the negative electrode are short-circuited is 2.0 V (Li/Li$^+$, same below) or less. That is, in the invention, the positive electrode uses an active material capable of reversibly doping lithium ion and/or anion, the negative electrode uses an active material capable of reversibly doping lithium ion, and lithium ion is doped in advance to the negative electrode and/or positive electrode so that a positive electrode potential after the positive electrode and the negative electrode are short-circuited may be 2.0 V or less. To dope lithium ion in advance means to supply lithium ion from a lithium ion supply source such as metal lithium other than the positive electrode and negative electrode to dope.

In the invention, that a positive electrode potential after the positive electrode and the negative electrode are short-circuited is 2.0 V or less means a case where either one of (A) a positive electrode potential obtained when after lithium ion is doped, a positive electrode terminal and a negative electrode terminal of a capacitor cell are directly connected with a conductive wire and left there for 12 hr or more, the short circuit is released, and a measurement is carried out within 0.5 to 1.5 hr and (B) a positive electrode potential obtained when after a constant current discharge is applied over 12 hr or more to 0 V by use of a charge and discharge test machine and a measurement is carried out within 0.5 to 1.5 hr is 2.0 V or less.

Furthermore, in the invention, that a positive electrode potential is 2.0 V or less after the positive electrode and the negative electrode are short-circuited means that the positive electrode potential becomes 2.0 V or less after short-circuiting in any one of states of, without restricting only to a state immediately after the lithium ion is doped, a charging state, a discharging state or the case of short-circuiting after charge and discharge are repeated.

In the invention, the positive electrode potential becoming 2.0 V or less after the positive electrode and negative electrode are short-circuited will be detailed below. As mentioned above, activated carbon and carbon materials usually have a potential of substantially 3 V. When a cell is assembled with activated carbon for both positive electrode and negative electrode, since both potentials become substantially 3 V, even after the short-circuiting, the positive electrode potential remains at substantially 3 V. Furthermore, also in the case of a so-called hybrid capacitor where activated carbon is used in a positive electrode and a carbon material such as graphite or non-graphitizable carbon that is used in a lithium ion secondary battery is used in a negative electrode, since a situation is same and both potentials become substantially 3 V, even after the short-circuiting, the positive electrode potential remains at substantially 3 V. Though depending on a weight balance of the positive electrode and negative electrode, upon charging, a negative electrode potential shifts to the proximity of 0 V and a charging voltage can be made higher; accordingly, a capacitor having high voltage and high energy density can be obtained. In general, the upper limit of the charging voltage is determined as a voltage where the electrolytic solution is not decomposed due to a rise in the positive electrode potential. Accordingly, when the positive electrode potential is set to the upper limit, by an amount of decrease in the negative electrode potential, the charging voltage can be heightened.

However, in the above-mentioned hybrid capacitor where the positive electrode potential becomes substantially 3 V upon short-circuiting, when the upper limit potential of the positive electrode is set at for instance 4.0 V, since the positive electrode potential at the discharge is up to 3.0 V, a potential variation of the positive electrode is substantially 1.0 V. That is, a capacity of the positive electrode cannot be fully utilized. Furthermore, when the lithium ion is doped (charged) to or dedoped (discharged) from the negative electrode, it is known that in many cases initial charge and discharge efficiency is low and the lithium ion that cannot be dedoped at the discharge is present. This is explained as a case where the lithium ion is consumed in decomposing the electrolytic solution on a surface of the negative electrode and a case where the lithium ion is trapped in a structural defect of a carbon material. However, in this case, the charge and discharge efficiency of the negative electrode becomes lower than that of the positive electrode, when the cell is short-circuited after the charge and discharge is repeated, the positive electrode potential becomes higher than 3 V and thereby the serviceable capacity is further lowered. That is, when the positive electrode, though capable of discharging from 4.0 V to 2.0 V, can use only from 4.0 V to 3.0 V, only a half a serviceable capacity is used; accordingly, a high voltage can be obtained but a high capacity cannot be obtained. In order to heighten the hybrid capacitor not only in the voltage and energy density but also in the capacity and energy density, the serviceable capacity of the positive electrode has to be improved.

When a positive electrode potential after the short-circuiting is lowered from 3.0 V by that just much, the serviceable capacity is increased and thereby high capacity can be obtained. In order to lower to 2.0 V or less, not only an amount charged by charge and discharge of the cell, lithium ion is preferably separately doped from a lithium ion supply source such as metal lithium to a negative electrode. Since the lithium ion is doped from other than the positive electrode and negative electrode, upon short-circuiting, an equilibrium potential is established between the positive electrode, negative electrode and metal lithium; accordingly, both the positive electrode potential and negative electrode potential become 3.0 V or less. The more abundant an amount of metal lithium becomes, the lower the equilibrium potential becomes. Since an equilibrium potential varies as the negative electrode active material and the positive electrode active material vary, in considering the characteristics of the negative electrode active material and positive electrode active material, an amount of lithium ion doped to the negative electrode is necessarily controlled so that a positive electrode potential after the short-circuiting may be 2.0 V or less.

In an LIC of the invention, that the positive electrode potential after the positive electrode and the negative electrode are short-circuited becomes 2.0 V or less means as mentioned above that separately from the positive electrode and the negative electrode of the LIC, lithium ion is supplied to the positive electrode and/or negative electrode. The lithium ion may be doped to either one or both of the negative electrode and the positive electrode. However, in the case of for instance activated carbon being used in the positive electrode, a dope amount of the lithium ion becomes much. In this case, the positive electrode potential becomes lower and the lithium ion is irreversibly consumed. As the result, since in some cases inconveniences such as a decrease in the cell capacity are caused, amounts of lithium ion supplied to the negative electrode and the positive electrode have to be appropriately controlled so that the inconvenience may not be caused. In all cases, since lithium ion doped to the positive electrode and/or negative electrode in advance due to an electrochemical contact of the lithium ion supply source and the positive electrode and/or negative electrode is supplied (doped) to the negative electrode upon charging, a negative electrode potential is lowered.

Furthermore, when the positive electrode potential after the positive electrode and the negative electrode are short-circuited is higher than 2.0 V, since an amount of lithium ion supplied to the positive electrode and/or negative electrode is slight, the energy density is small. The more abundant an amount of supplied lithium ion is, the lower the positive electrode potential after the positive electrode and negative electrode are short-circuited becomes to improve the energy density. In order to obtain higher energy density, 2.0 V or less is preferred, and in order to obtain further higher energy density 1.0 V or less is preferred. That the positive electrode potential after the positive electrode and negative electrode are short-circuited becomes lower is in other words that an amount of lithium ion supplied to the negative electrode becomes much upon charging a cell. As the capacitance of the negative electrode increases, a variation of the negative electrode potential becomes smaller. As the result, a variation of the positive electrode potential becomes larger and the capacitance and capacity of the cell become larger, and thereby high energy density can be obtained.

However, when the positive electrode potential becomes lower than 1.0 V, though depending on the positive electrode active material, inconveniences such as gas generation and irreversible consumption of the lithium ion are generated, resulting in difficulty in measuring the positive electrode potential. Furthermore, when the positive electrode potential becomes too low means that a negative electrode weight is excessive, conversely the energy density is lowered. Accordingly, in general, the positive electrode potential is 0.1 V or more and preferably 0.3 V or more.

In the invention, the capacitance and the capacitance are defined as shown below. The capacitance of a cell shows a gradient of a discharge curve of a cell and has a unit of F (farad). The capacitance per weight of a cell is a value obtained by dividing the capacitance of the cell by a total weight of weight of the positive electrode active material and weight of negative electrode active material filled in the cell and has a unit of F/g. Furthermore, the capacitance of the positive electrode shows a gradient of a discharge curve of the positive electrode and has a unit of F. Still furthermore, the capacitance per weight of the positive electrode is a value obtained by dividing the capacitance of the positive electrode by weight of the positive electrode active material filled in the cell and has a unit of F/g. The capacitance of the negative electrode shows a gradient of a discharge curve of the negative electrode and has a unit of F. Furthermore, the capacitance per weight of the negative electrode is a value obtained by dividing the capacitance of the negative electrode by weight of the negative electrode active material filled in the cell and has a unit of F/g.

Furthermore, the cell capacity is a product of difference of a discharge start voltage and a discharge end voltage of a cell, that is, a variation of voltage and the capacity of the cell, and has a unit of C (Coulomb). However, since 1 C is an amount of electricity when a current of 1 A flows during 1 second, in the invention, the cell capacity is expressed in terms of mAh. The positive electrode capacity is a product of difference of the positive electrode potential at the discharge start and the positive electrode potential at the discharge end (variation of positive electrode potential) and the capacitance of the positive electrode, and has a unit of C or mAh. At the same time, the negative electrode capacity is a product of difference of the negative electrode potential at the discharge start and the negative electrode potential at the discharge end (variation of negative electrode potential) and the capacitance of the negative electrode, and has a unit of C or mAh. The cell capacity, the positive electrode capacity and the negative electrode capacity coincide with each other.

The invention is characterized in that in the LIC, when the capacitance per unit weight of the positive electrode, the weight of the positive electrode active material, the capacitance per weight of the negative electrode and the weight of the negative electrode active material, respectively, are expressed by $C_+$(F/g), $W_+$(g); $C_-$(F/g) and $W_-$(g), a value of $(C_- \times W_-)/(C_+ \times W_+)$ is 5 or more and preferably 10 or more. When the $(C_- \times W_-)/(C_+ \times W_+)$ is set 5 or more, that is, the capacitance of the negative electrode is set 5 times or more that of the positive electrode, the capacity retention rate of the cell can be improved, and thereby the cell can be made higher in the endurance and longer in the lifetime. When the $(C_- \times W_-)/(C_+ \times W_+)$ is less than 5, since a diminishing rate of the cell capacity when $C_-$ is diminished due to repeated use of the cell increases to lower the capacity retention rate, the cell lifetime becomes shorter.

When, with the positive electrode active material and the negative electrode active material being used taking into consideration, the weight of the positive electrode active material, weight of the negative electrode active material and an amount of lithium ion doped to the negative electrode are made appropriate so that the $(C_- \times W_-)/(C_+ \times W_+)$ may be 5 or more, the lifetime of the LIC in the invention can be made longer. Specifically, in the selected positive electrode active material and negative electrode active material, when a weight ratio of the negative electrode is made larger than that of the positive electrode, that is, weight of the negative electrode active material is increased (increase in $W_-$), the lifetime can be made longer. Furthermore, when an amount of lithium ion doped to the negative electrode is made larger to make the capacitance per weight of the negative electrode larger (increase in $C_-$), the lifetime can be made longer. Thus, though the longer lifetime can be obtained owing to either one or both of (an increase in $W_-$) and (an increase in $C_-$), an amount of lithium ion doped to the negative electrode, since there are restrictions such as the safety of the cell and a limit of a doping amount of the lithium ion in the negative electrode active material, is usually preferably prioritized to make a weight ratio of the negative electrode larger (increase in $W_-$). Thereupon, an amount of lithium ion doped to the negative electrode is increased within a range that does not cause the disturbance to increase $C_-$. However, in the invention, without restricting thereto, the value of $(C_-\times W_-)/(C_+\times W_+)$ can be comprehensively determined so as to be 5 or more. For instance, when a negative electrode active material that can obtain larger capacitance per weight by a slight amount of lithium ion amount is used, even when the weight ratio of the negative electrode is small, a value of $(C_-\times W_-)/(C_+\times W_+)$ can be made 5 or more. When the weight ratio of the negative electrode is made larger (an increase in $W_-$) to render the $(C_-\times W_-)/(C_+\times W_+)$ 5 or more, even when the capacitance $C_-$ per unit weight of the negative electrode decreases as the cell is repeatedly used, since $W$ is set larger, sufficient negative electrode capacitance can be secured. Furthermore, when the $C_-$ is set larger as well, even after the $C_-$ decreases, sufficient negative electrode capacitance can be secured. Accordingly, the diminishing rate of the electrostatic capacitance of the cell can be made smaller compared with a case where the $(C_-\times W_-)/(C_+\times W_+)$ is less than 5.

In the LIC of the invention, as the value of $(C_-\times W_-)/(C_+\times W_+)$ becomes larger, the endurance of the cell is improved. However, in the case of $W_-$ being increased to make the value of $(C_-\times W_-)/(C_+\times W_+)$ larger, when the weight ratio of the negative electrode becomes larger, a high capacitance cell can be obtained only with difficulty. There is no upper limit value of the $(C_-\times W_-)/(C_+\times W_+)$. However, in order to establish a balance between assurance of the capacitance of the cell and longer lifetime thereof, in accordance with the electrostatic capacitance per weight of the negative electrode active material being used, the value of $(C_-\times W_-)/(C_+\times W_+)$ is preferably smaller than a certain value. For instance, when a positive electrode active material having the capacitance per unit weight of 100 (F/g) and a negative electrode active material having the capacitance per unit weight of 1000 (F/g) are used, a practical value of $(C_-\times W_-)/(C_+\times W_+)$ is, from viewpoint of easiness of securing a high capacitance and high voltage LIC, preferably 20 or less. However, it is not applied to a case where a negative electrode active material having larger electrostatic capacitance per unit weight is used.

Furthermore, in the LIC of the invention, it is preferred that the negative electrode active material has the capacitance per unit weight three-times or more that of the positive electrode active material and the weight of the positive electrode active material is larger than that of the negative electrode active material. The positive electrode active material that is used substantially determines the capacitance of the positive electrode. Accordingly, when an amount of lithium ion doped in advance to the negative electrode is controlled by taking the capacitance of the positive electrode into consideration, capacitance three times or more that the capacitance per unit weight of the positive electrode can be secured and an amount of the positive electrode active material can be made larger than that the negative electrode active material. Thereby, a capacitor higher in the voltage and capacity than an existing electric double layer capacitor can be obtained. Furthermore, when a negative electrode having capacitance per unit weight larger than capacitance per unit weight of a positive electrode is used, without changing an amount of variation of the negative electrode potential, weight of the negative electrode active material can be reduced, a filling amount of the positive electrode active material can be increased and thereby the capacitance of the cell and capacity thereof can be made larger. In order to obtain a high capacitance cell, weight of the positive electrode active material is preferably larger than weight of the negative electrode active material and more preferably in the range of 1.1 to 10 times. When it is less than 1.1 times, capacity difference from an existing electric double layer capacitor becomes small. When it exceeds 10 times, conversely, in some cases, the capacity becomes smaller than that of the existing electric double layer capacitor and difference of thicknesses of the positive electrode and negative electrode becomes too large to be unfavorable from the viewpoint of cell configuration.

In what follows, main elements that constitute a lithium ion capacitor of the invention will be sequentially described. As a positive electrode current collector and a negative electrode current collector of the invention, various materials proposed generally in applications such as an organic electrolytic solution may be used. That is, in the positive electrode current collector, aluminum and stainless steel can be preferably used. In the negative electrode current collector, stainless steel, copper and nickel can be preferably used. These can be used in various shapes such as foil or net. In particular, in order to dope lithium ion in advance to the negative electrode and/or positive electrode, one provided with a hole penetrating through front and back surfaces is preferred. For instance, expanded metal, punching metal, metal mesh, foamed body or a porous foil provided with a through hole by etching can be cited. The through hole of the electrode current collector may be formed appropriately in circle, rectangle or others.

More preferably, ahead of forming an electrode, the through hole of the electrode current collector is at least partially clogged with a conductive material that is difficult to fall and a positive electrode and a negative electrode are formed thereon. Thereby, the productivity of electrodes is improved, a problem of deterioration in the reliability of the capacitor owing to the fall of the electrode can be overcome, and by making a thickness of an electrode including the current collector thinner, high energy density and high output density can be realized.

A shape and number of through holes of the electrode current collector can be appropriately set so that lithium ion in an electrolytic solution described below may move between front and back surfaces of the electrode without being interrupted by the electrode current collector and the through hole can be readily clogged with the conductive material.

The porosity of the electrode current collector is defined as obtained in terms of percentage of a ratio of $\{1-(\text{weight of current collector/true specific gravity of the current collector})/(\text{apparent volume of current collector})\}$. The porosity of the electrode current collector used in the invention is usually in the range of 10 to 79% and preferably in the range of 20 to 60%. The porosity and a hole diameter of the electrode current collector are desirably appropriately selected from the above range considering a structure of the cell and the productivity thereof.

The negative electrode active material, as far as it can dope lithium ion, is not particularly restricted. For instance, graphite, non-graphitizable carbon and a polyacene semiconductor (PAS) that is a pyrolysis product of an aromatic condensate polymer and has a polyacene skeleton structure where a ratio of numbers of hydrogen atoms and carbon atoms (herein after, referred to as H/C) is in the range of 0.50 to 0.05 can be cited. Above all, the PAS is preferred because of capable of obtaining large capacitance. When lithium ion of 400 mAh/g is doped (charged) to the PAS having the H/C of, for instance, substantially 0.2, followed by discharging, capacitance of

650 F/g or more can be obtained and when lithium ion of 500 mAh/g or more is doped (charged), followed by discharging, capacitance of 750 F/g or more can be obtained. From these, it is found that the PAS has very large capacitance.

When an active material having an amorphous structure like the PAS is used in a negative electrode in a preferable mode of the invention, since the more an amount of lithium ion doped is increased, the more the potential is lowered, the withstand voltage (charging voltage) of an obtained electric storage device becomes higher and the voltage-up speed (gradient of a discharge curve) in the discharge becomes lower; accordingly, corresponding to a required usage voltage of an electric storage device, an amount of lithium ion is desirably appropriately set in the range of doping capability of lithium ion of the active material.

Furthermore, the PAS, having an amorphous structure, does not exhibit a structural change such as swelling and contraction at the doping and dedoping of the lithium ion to be excellent in the cycle characteristics. Furthermore, the PAS, having a molecular structure (higher structure) isotropic to the doping and dedoping of the lithium ion, has the characteristics excellent in the rapid charging and rapid discharge as well. Accordingly, the PAS is preferred as a negative electrode active material.

The aromatic condensate polymer that is a precursor of the PAS is a condensate between an aromatic hydrocarbon compound and aldehyde. As the aromatic hydrocarbon compound, so-called phenols such as phenol, cresol and xylenol can be preferably used.

For instance, methylene/bisphenols expressed by a formula below

[formula 1]

(here, x and y, respectively and independently, express 0, 1 or 2) or hydroxy/biphenyls or hydroxynaphthalenes can be used. Above all, practically, phenols are preferred and phenol is particularly preferred.

Furthermore, as the aromatic condensate polymer, a modified aromatic condensate polymer in which an aromatic hydrocarbon compound having the phenolic hydroxyl group is partially substituted with an aromatic hydrocarbon compound that does not have a phenolic hydroxyl group such as xylene, toluene or aniline such as a condensate of phenol, xylene and formaldehyde can be used as well. Still furthermore, a modified aromatic polymer that is substituted with melamine or urea can be used and a furan resin is preferred as well.

In the invention, the PAS is used as an insoluble and infusible base material and the insoluble and infusible base material can be produced from, for instance, the aromatic condensate polymer as follows. That is, when the aromatic condensate polymer is gradually heated up to an appropriate temperature in the range of 400 to 800° C. under a non-oxidizing atmosphere (including vacuum atmosphere), an insoluble and infusible base material having the H/C in the range of 0.5 to 0.05 and preferably in the range of 0.35 to 0.10 can be obtained.

However, a producing method of the insoluble and infusible base material is not restricted to the above method. According to a method described in for instance JP-B 3-24024, an insoluble and infusible base material that has above-mentioned H/C and the specific surface area due to the BET method of 600 m²/g or more can be obtained as well.

The insoluble and infusible base material used in the invention, according to the X-ray diffractometry (Cu Kα), has a main peak at a position of 24° or less by 2θ and, other than the main peak, another broad peak in the range of 41 through 46θ. That is, the insoluble and infusible base material has a polyacene skeleton structure where an aromatic polycyclic structure is appropriately developed and that has an amorphous structure; accordingly, since the lithium ion can be stably doped, the insoluble and infusible base material can be preferably used as an active material for a lithium ion electric storage device.

In the invention, the negative electrode active material preferably has a pore diameter of 3 nm or more and a pore volume of 0.10 mL/g or more. The upper limit of the pore diameter is not limited but usually in the range of 3 to 50 nm. Furthermore, the range of the pore volume is not particularly limited but usually in the range of 0.10 to 0.5 mL/g and preferably in the range of 0.15 to 0.5 mL/g.

In the invention, a negative electrode is formed from the negative electrode active material powder such as the carbon material or the PAS on the negative electrode current collector, and, as a process therefor, without restricting to a particular method, known processes can be used. Specifically, a powder of a negative electrode active material, a binder and, as needs arise, a conductive powder are dispersed in an aqueous or organic solvent to prepare a slurry, the slurry is coated on the current collector or may be formed in advance into a sheet, followed by sticking the sheet to a current collector to form a negative electrode. As the binder used here, for instance, rubber binders such as SBR; fluorine-containing resins such as polytetrafluoroethylene and polyvinylidene fluoride; and thermoplastic resins such as polypropylene, polyethylene and polyacrylate can be used. A usage amount of the binder, though different depending on the kind of the negative electrode active material and a shape of the electrode, is in the range of 1 to 20% by weight and preferably in the range of 2 to 10% by weight to the negative electrode active material.

Furthermore, as conductive materials used as needs arise, acetylene black, graphite and metal powder can be cited. A usage amount of the conductive material, though different depending on the conductivity of the negative electrode active material and a shape of the electrode, is preferably added at a ratio in the range of 2 to 40% by weight to the negative electrode active material. A thickness of the negative electrode active material is designed from a balance with a thickness of the positive electrode active material so that the energy density of the cell may be secured. However, when the output density, energy density and lifetime of the cell and the industrial productivity are taken into consideration, one surface of the current collector usually has a thickness in the range of 15 to 100 μm and preferably in the range of 20 to 80 μm.

In the LIC of the invention, the positive electrode contains a positive electrode active material that can reversibly dope lithium ion and/or anion such as tetra fluoroborate. As the positive electrode active material, without restricting particularly to one that can reversibly dope lithium ion and/or anion, for instance, activated carbon, a conductive polymer or a polyacene organic semiconductor (PAS) that is a pyrolysis product of an aromatic condensate polymer and has a polyacene skeleton structure where the H/C is in the range of 0.05 to 0.50 can be cited.

A method of forming a positive electrode on a positive electrode current collector with the positive electrode active material is substantially same as that of the negative electrode; accordingly, it will be omitted detailing here.

As an electrolytic solution used in the LIC of the invention, an electrolyte that can transport lithium ion is used. As such an electrolyte, one that is usually in liquid and can be impregnated in a separator is preferred. As a solvent of the electrolyte, a non-protonic organic solvent that can form a non-protonic organic solvent electrolytic solution can be preferably used. As the non-protonic organic solvents, for instance, ethylene carbonate, propylene carbonate, dimethyl carbonate, diethyl carbonate, ethylmethyl carbonate, γ-butyrolactone, acetonitrile, dimethoxyethane, tetra hydrofuran, dioxolane, methylene chloride and sulfolane can be cited. Furthermore, at least two kinds of the non-protonic organic solvents may be mixed and used.

Furthermore, as an electrolyte that is dissolved in the solvent, all electrolytes that can transport lithium ion and is not electrolyzed even under a high voltage and where lithium ion can stably exist can be used. Examples of such electrolytes preferably include lithium salts such as $LiClO_4$, $LiAsF_6$, $LiBF_4$, $LiPF_6$, $LiN(C_2F_5SO_2)_2$ and $LiN(CF_3SO_2)_2$.

It is preferred that the electrolyte and solvent are mixed after sufficiently dewatered to form an electrolytic solution. A concentration of the electrolyte in the electrolytic solution, in order to lower the internal resistivity owing to the electrolytic solution, is preferably set at least at 0.1 mol/L or more and more preferably in the range of 0.5 to 1.5 mol/L.

Furthermore, as a separator, a non-conductive porous body having a communicating hole that has the durability to the electrolytic solution or electrode active materials can be used. As materials of the separator, resins such as cellulose (paper), polyethylene and polypropylene can be cited and known materials can be used. Among these, cellulose (paper) is excellent from the viewpoints of the durability and economic efficiency. As a usage shape, as mentioned above, non-woven fabric of paper or resin is preferred. A thickness of the separator, without restricting particularly, is preferably in the range of substantially 20 to 50 µm.

Still furthermore, a metal lithium foil that is used as a lithium ion supply source for doping lithium ion in advance to a negative electrode and/or positive electrode is formed of a material that contains at least a lithium element such as metal lithium or a lithium-aluminum alloy and can supply lithium ion. Inside of a capacitor, an amount of a metal lithium foil that can dope a predetermined amount of lithium ion to the negative electrode and/or positive electrode is preferably disposed. Furthermore, as a current collector that is integrated with the metal lithium foil, as mentioned above, a conductive porous body is preferred. Specifically, a metal porous body such as a stainless mesh that does not react with metal lithium can be preferably used.

In the invention, a material of an exterior case is not particularly restricted. Metal materials such as iron and aluminum, plastic materials or composite materials obtained by laminating these that are generally used in batteries or capacitors can be used. Furthermore, a shape of the exterior case is not particularly restricted. However, from viewpoints of miniaturization and weight saving of capacitors, a film type exterior case that uses a laminated film of aluminum and a polymer such as nylon and polypropylene is preferred. In what follows, specific examples will be detailed.

Example 1

Producing Method of Negative Electrode 1

A phenol resin molded sheet having a thickness of 0.5 mm was put in a Siliconit electric furnace and heated under a nitrogen atmosphere to 550° C. at a temperature-up speed of 50° C./hr, followed by further heating to 800° C. at a temperature-up speed of 10° C./hr, further followed by heat-treating, and thereby PAS was synthesized. Thus obtained PAS plate was pulverized by use of a ball mill and thereby a PAS powder having an average particle diameter of substantially 4 µm was obtained. The PAS powder had the H/C ratio of 0.1. In the next place, 92 parts by weight of the PAS powder, 6 parts by weight of acetylene black powder, 5 parts by weight of an acrylic binder, 3 parts by weight of carboxylmethyl cellulose and 200 parts by weight of water were thoroughly mixed, and thereby a slurry was obtained. The slurry was coated by use of a roll coater on both surfaces of a negative electrode current collector made of a copper expanded metal (produced by Nippon Metal Industry Co., Ltd.) having a thickness of 32 µm (porosity: 57%) to form a negative electrode layer, followed by vacuum drying, and thereby a negative electrode 1 having a total thickness (sum total of thicknesses of electrode layers on both surfaces of the negative electrode and a thickness of negative electrode current collector) of 78 µm was obtained.

(Producing Method of Positive Electrode 1)

Firstly, 92 parts by weight of commercially available activated carbon powder having the specific surface area of 2000 $m^2/g$, 6 parts by weight of acetylene black powder, 7 parts by weight of an acrylic binder, 4 parts by weight of carboxyl methyl cellulose and 200 parts by weight of water were thoroughly mixed, and thereby a slurry was obtained. A nonaqueous carbon based conductive paint was coated by use of a roll coater on both surfaces of a 38 µm thick aluminum expanded metal (porosity: 47%) (produced by Nippon Metal Industry Co., Ltd.), followed by drying, and thereby a positive electrode current collector on which a conductive layer is formed was obtained. A total thickness (sum total of current collector thickness and conductive layer thickness) was 52 µm and the through hole was substantially clogged with the conductive paint. The positive electrode slurry was coated by use of a roll coater on both surfaces of the positive electrode current collector to form positive electrode layers, followed by vacuum drying, and thereby a positive electrode 1 having a thickness of an entire positive electrode (sum total of thicknesses of electrode layers on both surfaces of a positive electrode, thicknesses of conductive layers on both surfaces and a thickness of a positive electrode current collector) of 182 µm was obtained.

(Measurement of Capacitance Per Unit Weight of Negative Electrode 1)

From the negative electrode 1, a sheet having a size of 1.5 cm×2.0 cm was cut and used as an evaluation negative electrode. The negative electrode and metal lithium having a size of 1.5 cm×2.0 cm and a thickness of 200 µm as a counter electrode were assembled through a polyethylene nonwoven fabric having a thickness of 50 µm as a separator to prepare a simulated cell. As a reference electrode, metal lithium was used. As an electrolytic solution, a solution obtained by dissolving $LiPF_6$ in propylene carbonate at a concentration of 1 mol/l was used. Under a charging current of 1 mA, to weight of a negative electrode active material, lithium ion of 600 mAh/g was doped, followed by discharging under 1 mA to 1.5 V. From the discharging time during which the potential varies by 0.2 V from the negative electrode potential 1 min after the discharge start, the capacitance per unit weight of the negative electrode was obtained and found to be 1300 F/g.

(Measurement of Capacitance Per Unit Weight of Positive Electrode 1)

From the positive electrode 1, a sheet having a size of 1.5 cm×2.0 cm was cut and used as evaluation positive electrode.

The positive electrode and metal lithium having a size of 1.5 cm×2.0 cm and a thickness of 200 μm as a counter electrode were assembled through a polyethylene nonwoven fabric having a thickness of 50 μm as a separator to prepare a simulated cell. As a reference electrode, metal lithium was used. As an electrolytic solution, a solution obtained by dissolving LiPF$_6$ in propylene carbonate at a concentration of 1 mol/l was used. The charging was carried out under a charging current of 1 mA to 3.6 V, followed by applying constant voltage charging, after a total charging time of 1 hr, further followed by discharging under 1 mA to 2.5V. From a discharging time between 3.6 V to 2.5 V, the capacitance per unit weight of the positive electrode was obtained and found to be 140 F/g.

(Preparation of Cell 1)

From the positive electrode 1, five sheets having a size of 2.4 cm×3.8 cm were cut and from the negative electrode 1, 6 sheets having a size of 2.5 cm×3.9 cm were cut. The cut positive electrode 1 and negative electrode 1 were laminated through a separator and dried at 150° C. for 12 hr, followed by disposing a separator on each of the uppermost and lowermost portions, further followed by sealing four sides with a tape, and thereby an electrode laminated unit was obtained. One sheet obtained by pressure bonding metal lithium equivalent to 600 mAh/g per weight of a negative electrode active material to a copper lath having a thickness of 23 μm was disposed on the outermost portion of the electrode laminated unit so as to face the negative electrode. The negative electrodes (6 sheets) and the copper lath thereto a metal lithium foil are pressure bonded, respectively, were welded to bring into contact, and thereby an electrode laminated unit was obtained. To each of terminal welding portions (5 sheets) of the positive electrode current collectors of the electrode laminated unit, an aluminum positive electrode terminal having a width of 3 mm, a length of 50 mm and a thickness of 0.1 mm, on a sealing portion of which a sealant film is hot-sealed in advance was superposed and welded by ultrasonic. Similarly, on each of terminal welding portions (6 sheets) of the negative electrode current collectors, a nickel negative electrode terminal having a width of 3 mm, a length of 50 mm and a thickness of 0.1 mm, on a sealing portion of which a sealant film is hot-sealed in advance was superposed and welded by ultrasonic, followed by disposing between an exterior film deep drawn to a length of 60 mm, a width of 30 mm and a depth of 3 mm and an exterior film that is not deep drawn.

After one side of a terminal portion of the exterior laminate film and other two sides were hot-sealed, as an electrolytic solution, a solution in which, in a mixed solvent obtained by mixing ethylene carbonate, diethylene carbonate and propylene carbonate at a volume ratio of 3:4:1, LiPF$_6$ was dissolved at a concentration of 1.2 mol/L was vacuum impregnated, followed by hot-sealing remaining one side under reduced pressure, further followed by vacuum sealing, and thereby 3 film type capacitor cells were assembled.

Furthermore, when, from a total weight of the positive electrode 1 (5 sheets) and a total weight of the negative electrode 1 (6 sheets), the respective weights of the active materials were calculated, it was found that weight of the positive electrode active material was 0.3 g and weight of the negative electrode active material was 0.25 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 7.7.

(Characteristics Evaluation of Cell 1)

When one cell was disassembled after leaving for 14 days after assembling the cell, the lithium metal was found completely disappeared. Accordingly, it was judged that lithium ion for obtaining capacitance of 1300 F/g per unit weight of the negative electrode active material was doped in advance. Thereafter, when a positive electrode and a negative electrode of one cell were short-circuited and the positive electrode potential was measured, it was found to be 0.8 V, that is, less than 2.0 V.

Remaining film type capacitor cells were charged under a constant current of 200 mA for a cell voltage to be 3.8 V, followed by applying a constant current-constant voltage charge where a constant voltage of 3.8 V was applied for 30 min. Subsequently, the charging was carried out under a constant current of 200 mA from the cell voltage to be 2.2 V. From the 3.8 V-2.2 V cycle, the initial capacitance and energy density were evaluated. Thereafter, in order to evaluate the endurance, a cell voltage of 3.6V was applied under an atmospheric temperature of 60° C., followed by carrying out the cycle after 2000 hr, and thereby the capacitance and the capacitance retention rate were evaluated. Results are shown in Table 1.

TABLE 1

| | Initial capacitance (F) | Energy density (Wh/L) | capacitance after 2000 hr (F) | Capacitance retention rate (%) |
|---|---|---|---|---|
| Example 1 | 37.1 | 14.0 | 32.3 | 86.9 |

When lithium ion was doped in advance to a negative electrode and/or positive electrode so that a positive electrode potential when the positive electrode and negative electrode are short-circuited may be 2.0 V or less, a capacitor having high energy density could be obtained. On the other hand, even after 2000 hr of the high temperature voltage application test, the capacitance retention rate showed such an excellent value as 86.9%. A value of $(C_- \times W_-)/(C_+ \times W_+)$ of example 1 was 7.7; accordingly, when a value of $(C_- \times W_-)/(C_+ \times W_+)$ was made 5 or more, a capacitor that combines excellent endurance and high energy density was obtained.

Example 2

Producing Method of Negative Electrode 2

According to a method similar to that of the negative electrode 1, a negative electrode 2 having a total thickness (sum total of thicknesses of electrode layers on both surfaces of the negative electrode and a thickness of negative electrode current collector) of 84 μm was obtained.

(Producing Method of Positive Electrode 2)

Except that commercially available activated carbon powder having the specific surface area of 1800 m$^2$/g was used, according to a method similar to that of the positive electrode 1, a positive electrode 2 having a thickness of entire positive electrode (sum total of thicknesses of electrode layers on both surfaces of a positive electrode, thicknesses of conductive layers on both surfaces and a thickness of a positive electrode current collector) of 225 μm was obtained.

(Measurement of Electrostatic Capacitance Per Unit Weight of Negative Electrode 2)

According to a method similar to that of the negative electrode 1, capacitance per unit weight of the negative electrode 2 was obtained and found to be 1300 F/g.

(Measurement of Capacitance Per Unit Weight of Positive Electrode 2)

According to a method similar to that of the positive electrode 1, capacitance per unit weight of the positive electrode 2 was obtained and found to be 80 F/g.

(Preparation of Cell 2)

According to a method similar to that of the cell 1 except that the positive electrode 2 and the negative electrode 2 were used, 3 cells were assembled. Furthermore, when, from a total weight of the positive electrode 2 (5 sheets) and a total weight of the negative electrode 2 (6 sheets), the respective weights of the active materials were calculated, it was found that weight of the positive electrode active material was 0.4 g and weight of the negative electrode active material was 0.27 g. Accordingly, with the electrostatic capacitance per weight of the positive electrode $C_+$(F/g), weight of the positive electrode active material $W_+$(g), the electrostatic capacitance per weight of the negative electrode $C_-$(F/g) and weight of the negative electrode active material $W_-$(g), a value of $(C_- \times W_-)/(C_+ \times W_+)$ became 10.9.

(Characteristics Evaluation of Cell 2)

When one cell was disassembled after leaving for 14 days after assembling the cell, the lithium metal was found completely disappeared. Accordingly, it was judged that lithium ion for obtaining capacitance of 1300 F/g per unit weight of the negative electrode active material was doped in advance. Thereafter, when a positive electrode and a negative electrode of one cell were short-circuited and the positive electrode potential was measured, it was found to be 0.83 V, that is, less than 2.0 V.

Remaining film type capacitor cells were evaluated according to a method similar to that of the cell 1. Results are shown in Table 2.

TABLE 2

|  | Initial capacitance (F) | Energy density (Wh/L) | capacitance after 2000 hr (F) | Capacitance retention rate (%) |
|---|---|---|---|---|
| Example 2 | 29.3 | 10.2 | 26.4 | 90.2 |

When lithium ion was doped in advance to a negative electrode and/or positive electrode so that a positive electrode potential when the positive electrode and negative electrode were short-circuited may be 2.0 V or less, even when a positive electrode active material low in the capacitance per weight was used, a capacitor having high energy density could be obtained. On the other hand, even after 2000 hr of the high temperature voltage application test, the capacitance retention rate showed such an excellent value as 90.2% that is more excellent than example 1. A value of $(C_- \times W_-)/(C_+ \times W_+)$ of example 2 was 10.9; accordingly, when a value of $(C_- \times W_-)/(C_+ \times W_+)$ was made 10 or more, a capacitor that combines excellent endurance and high energy density was obtained. Accordingly, when the endurance is considered important, a value of $(C_- \times W_-)/(C_+ \times W_+)$ is preferably set at 10 or more.

Example 3

Producing Method of Positive Electrode 3

Except that commercially available activated carbon powder having the specific surface area of 2200 m²/g was used, according to a method similar to that of the positive electrode 1, a positive electrode 3 having a thickness of entire positive electrode (sum total of thicknesses of electrode layers on both surfaces of a positive electrode, thicknesses of conductive layers on both surfaces and a thickness of a positive electrode current collector) of 181 μm was obtained.

(Measurement of Electrostatic Capacitance Per Unit Weight of Positive Electrode 3)

According to a method similar to that of the positive electrode 1, capacitance per unit weight of the positive electrode 3 was obtained and found to be 160 F/g.

(Preparation of Cell 3)

According to a method similar to that of the cell 1 except that the positive electrode 3 was used, 3 cells were assembled. Furthermore, when, from a total weight of the positive electrode 3 (5 sheets) and a total weight of the negative electrode 1 (6 sheets), the respective weights of the active materials were calculated, it was found that weight of the positive electrode active material was 0.3 g and weight of the negative electrode active material was 0.25 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 6.8.

(Characteristics Evaluation of Cell 3)

When one cell was disassembled after leaving for 14 days after assembling the cell, the lithium metal was found completely disappeared. Accordingly, it was judged that lithium ion for obtaining capacitance of 1300 F/g per unit weight of the negative electrode active material was doped in advance.

Thereafter, when a positive electrode and a negative electrode of one cell were short-circuited and the positive electrode potential was measured, it was found to be 0.81 V, that is, less than 2.0 V.

Remaining film type capacitor cells were evaluated according to a method similar to that of the cell 1. Results are shown in Table 3.

TABLE 3

|  | Initial capacitance (F) | Energy density (Wh/L) | capacitance after 2000 hr (F) | Capacitance retention rate (%) |
|---|---|---|---|---|
| Example 3 | 41.7 | 15.8 | 35.7 | 85.5 |

When lithium ion was doped in advance to a negative electrode and/or positive electrode so that a positive electrode potential when the positive electrode and negative electrode were short-circuited may be 2.0 V or less, a capacitor having high energy density could be obtained. In example 3, since a positive electrode active material large in the capacitance per weight is used, the capacitor has the energy density higher than that of example 1. On the other hand, even after 2000 hr of the high temperature voltage application test, the capacitance retention rate showed such an excellent value as 85.5%. A value of $(C_- \times W_-)/(C_+ \times W_+)$ of example 3 was 6.8; accordingly, even when a positive electrode active material having high capacitance was used, when a value of $(C_- \times W_-)/(C_+ \times W_+)$ is made 5 or more, a capacitor that combines excellent endurance and high energy density was obtained.

Example 4

Producing Method of Negative Electrode 3

According to a method similar to that of the negative electrode 1, a negative electrode 3 having a total thickness (sum total of thicknesses of electrode layers on both surfaces of the negative electrode and a thickness of negative electrode current collector) of 66 μm was obtained.
(Measurement of Capacitance Per Unit Weight of Negative Electrode 3)

Except that lithium ion equivalent to 750 mAh/g was doped to unit weight of the negative electrode active material, according to a method similar to that of the negative electrode 1, the capacitance per unit weight of the negative electrode 3 was obtained and found to be 2600 F/g.
(Preparation of Cell 4)

Except that a negative electrode 3 was used and metal lithium equivalent to 750 mAh/g per unit weight of the negative electrode active material was disposed, according to a method similar to that of the cell 1, 3 cells were assembled.

Furthermore, when, from a total weight of the positive electrode 1 (5 sheets) and a total weight of the negative electrode 3 (6 sheets), the respective weights of the active materials were calculated, it was found that weight of the positive electrode active material was 0.3 g and weight of the negative electrode active material was 0.2 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 12.4.
(Characteristics Evaluation of Cell 4)

When one cell was disassembled after leaving for 14 days after the cell was assembled, the lithium metal was found completely disappeared. Accordingly, it was judged that lithium ion for obtaining capacitance of 2600 F/g per unit weight of the negative electrode active material was doped in advance.

Thereafter, when a positive electrode and a negative electrode of one cell were short-circuited and the positive electrode potential was measured, it was found to be 0.7 V, that is, less than 2.0 V.

Remaining film type capacitor cells were evaluated according to a method similar to that of the cell 1. Results are shown in Table 4.

TABLE 4

| | Initial capacitance (F) | Energy density (Wh/L) | Capacitance after 2000 hr (F) | Capacitance retention rate (%) |
|---|---|---|---|---|
| Example 4 | 38.9 | 15.1 | 35.1 | 90.4 |

When lithium ion was doped in advance to a negative electrode and/or positive electrode so that a positive electrode potential when the positive electrode and negative electrode are short-circuited may be 2.0 V or less, a capacitor having high energy density could be obtained. In example 4, since a negative electrode abundant in an amount of previously doped lithium ion and large in the capacitance per weight is used, the capacitor has the energy density higher than that of example 1. On the other hand, even after 2000 hr of the high temperature voltage application test, the capacitance retention rate showed such an excellent value as 90.4% that is more excellent than example 1. A value of $(C_- \times W_-)/(C_+ \times W_+)$ of example 4 was 12.4. Accordingly, even when a negative electrode having high electrostatic capacitance was used, when a value of $(C_- \times W_-)/(C_+ \times W_+)$ was made 10 or more, a capacitor that combines more excellent endurance and high energy density was obtained.

Example 5

Producing Method of Negative Electrode 4

Furfuryl alcohol that is a raw material of furan resin carbon was held at 60° C. for 24 hr to harden the resin, and thereby a black resin was obtained. The obtained black resin was put in a stationary electric furnace, heated to 1200° C. in 3 hr in a nitrogen atmosphere and held there for 2 hr. After leaving to cool, a sample was taken out and pulverized by use of a ball mill, and thereby non-graphitizable carbon powder having an average particle diameter of substantially 8 μm was obtained. The H/C value of the non-graphitizable carbon powder was 0.008.

In the next place, according to a method similar to that of the negative electrode 1 except that the non-graphitizable carbon powder was used, a negative electrode 4 having an entire thickness (sum total of thicknesses of electrode layers on both surfaces of the negative electrode and a thickness of the negative electrode current collector) of 63 μm was obtained.
(Producing Method of Positive Electrode 4)

According to a method similar to that of the positive electrode 1, a positive electrode 4 having a thickness of an entire positive electrode (sum total of thicknesses of electrode layers on both surfaces of the positive electrode, thicknesses of the conductive layers on both surfaces and a thickness of the positive electrode current collector) of 204 μm was obtained.
(Measurement of Capacitance Per Unit Weight of Negative Electrode 4)

Except that lithium ion equivalent to 550 mAh/g per weight of the negative electrode active material was doped, according to a method similar to that of the negative electrode 1, the capacitance per unit weight of the negative electrode 4 was measured and found to be 6200 F/g.
(Measurement of Capacitance Per Unit Weight of Positive Electrode 4)

According to a method similar to that of the positive electrode 1, the capacitance per unit weight of the positive electrode 4 was measured and found to be 140 F/g.
(Preparation of Cell 5)

Except that the positive electrode 4 and the negative electrode 4 were used and metal lithium equivalent to 550 mAh/g per unit weight of the negative electrode active material was disposed, according to a method similar to that of the cell 1, 3 cells were assembled.

Furthermore, when, from a total weight of the positive electrode 4 (5 sheets) and a total weight of the negative electrode 4 (6 sheets), the respective weights of the active materials were calculated, it was found that weight of the positive electrode active material was 0.35 g and weight of the negative electrode active material was 0.18 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 22.8.
(Characteristics Evaluation of Cell 5)

When one cell was disassembled after leaving for 14 days after the cell was assembled, the lithium metal was found completely disappeared. Accordingly, it was judged that lithium ion for obtaining capacitance of 6200 F/g per unit weight of the negative electrode active material was doped in advance.

Thereafter, when a positive electrode and a negative electrode of one cell were short-circuited and the positive electrode potential was measured, it was found to be 0.85 V, that is, less than 2.0 V.

Remaining film type capacitor cells were evaluated according to a method similar to that of the cell 1. Results are shown in Table 5.

TABLE 5

|  | Initial capacitance (F) | Energy density (Wh/L) | capacitance after 2000 hr (F) | Capacitance retention rate (%) |
|---|---|---|---|---|
| Example 5 | 47.0 | 17.7 | 44.5 | 94.7 |

When lithium ion was doped in advance to a negative electrode and/or positive electrode so that a positive electrode potential when the positive electrode and negative electrode are short-circuited may be 2.0 V or less, a capacitor having high energy density could be obtained. In example 5, the capacitance $C_-$ per weight of the negative electrode was set larger to set a value of $(C_- \times W_-)/(C_+ \times W_+)$ such a large value as 22.8. Accordingly, with a value of $(C_- \times W_-)/(C_+ \times W_+)$ setting 10 or more, a positive electrode weight ratio as well could be set larger; as the result, a cell higher in the capacitance and energy density than that of cells of other examples could be obtained. Furthermore, the capacitance retention rate after 2000 hr of the high temperature voltage application test shows very excellent endurance such as 94.7%. Accordingly, when a value of $(C_- \times W_-)/(C_+ \times W_+)$ was set 10 or more with a negative electrode having larger capacitance per unit weight, a capacitor that combines more excellent endurance and very high energy density was obtained.

Comparative Example 1

Producing Method of Negative Electrode 5

According to a method similar to that of the negative electrode 1, a negative electrode 5 having a total thickness (sum total of thicknesses of electrode layers on both surfaces of the negative electrode and a thickness of negative electrode current collector) of 49 μm was obtained.
(Producing Method of Positive Electrode 5)

According to a method similar to that of the positive electrode 1, a positive electrode 5 having a total thickness (sum total of thicknesses of electrode layers on both surfaces of a positive electrode, thicknesses of conductive layers on both surfaces and a thickness of a positive electrode current collector) of 226 μm was obtained.
(Measurement of Capacitance Per Unit Weight of Negative Electrode 5)

According to a method similar to that of the negative electrode 1, capacitance per unit weight of the negative electrode 5 was obtained and found to be 1300 F/g.
(Measurement of Capacitance Per Unit Weight of Positive Electrode 5)

According to a method similar to that of the positive electrode 1, capacitance per unit weight of the positive electrode 5 was obtained and found to be 140 F/g.
(Preparation of Cell 6)

According to a method similar to that of the cell 1 except that the positive electrode 5 and the negative electrode 5 were used, 3 cells were assembled.

Furthermore, when, from a total weight of the positive electrode 5 (5 sheets) and a total weight of the negative electrode 5 (6 sheets), the respective weights of the active materials were calculated, it was found that weight of the positive electrode active material was 0.4 g and weight of the negative electrode active material was 0.13 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 3.
(Characteristics Evaluation of Cell 6)

When one cell was disassembled after leaving for 14 days after assembling the cell, the lithium metal was found completely disappeared. Accordingly, it was judged that lithium ion for obtaining capacitance of 1300 F/g per unit weight of the negative electrode active material was doped in advance.

Thereafter, when a positive electrode and a negative electrode of one cell were short-circuited and the positive electrode potential was measured, it was found to be 0.9 V, that is, less than 2.0 V.

Remaining film type capacitor cells were evaluated according to a method similar to that of the cell 1. Results are shown in Table 6.

TABLE 6

|  | Initial capacitance (F) | Energy density (Wh/L) | capacitance after 2000 hr (F) | Capacitance retention rate (%) |
|---|---|---|---|---|
| Comparative Example 1 | 42.3 | 15.8 | 32.0 | 75.7 |

When lithium ion was doped in advance to a negative electrode and/or positive electrode so that a positive electrode potential when the positive electrode and negative electrode are short-circuited may be 2.0 V or less, a capacitor having high energy density could be obtained. On the other hand, although a value of $(C_- \times W_-)/(C_+ \times W_+)$ of comparative example 1 was 3, the capacitance retention rate after 2000 hr of the high temperature voltage application test was 75.7%, that is, very lower than that of the cells of examples.

Accordingly, when the endurance is considered important, a value of $(C_- \times W_-)/(C_+ \times W_+)$ is preferably set at 5 or more.

Comparative Example 2

Producing Method of Negative Electrode 6

According to a method similar to that of the negative electrode 1, a negative electrode 6 having a total thickness (sum total of thicknesses of electrode layers on both surfaces of the negative electrode and a thickness of negative electrode current collector) of 40 μm was obtained.
(Producing Method of Positive Electrode 6)

According to a method similar to that of the positive electrode 1 except that commercially available activated carbon having the specific surface area of 2200 m²/g was used, a positive electrode 6 having a total thickness (sum total of thicknesses of electrode layers on both surfaces of a positive electrode, thicknesses of conductive layers on both surfaces and a thickness of a positive electrode current collector) of 225 μm was obtained.
(Measurement of Capacitance Per Unit Weight of Negative Electrode 6)

According to a method similar to that of the negative electrode 1, capacitance per unit weight of the negative electrode 6 was measured and found to be 1300 F/g.

(Measurement of Capacitance Per Unit Weight of Positive Electrode 6)

According to a method similar to that of the positive electrode 1, capacitance per unit weight of the positive electrode 6 was obtained and found to be 160 F/g.

(Preparation of Cell 7)

According to a method similar to that of the cell 1 except that the positive electrode 6 and the negative electrode 6 were used, 3 cells were assembled.

Furthermore, when, from a total weight of the positive electrode 6 (5 sheets) and a total weight of the negative electrode 6 (6 sheets), the respective weights of the active materials were calculated, it was found that weight of the positive electrode active material was 0.4 g and weight of the negative electrode active material was 0.1 g. Accordingly, with the capacitance per weight of the positive electrode $C_+$(F/g), weight of the positive electrode active material $W_+$(g), the capacitance per weight of the negative electrode $C_-$(F/g) and weight of the negative electrode active material $W_-$(g), a value of $(C_- \times W_-)/(C_+ \times W_+)$ became 2.

(Characteristics Evaluation of Cell 7)

When one cell was disassembled after leaving for 14 days after assembling the cell, the lithium metal was found completely disappeared. Accordingly, it was judged that lithium ion for obtaining capacitance of 1300 F/g per unit weight of the negative electrode active material was doped in advance.

Thereafter, when a positive electrode and a negative electrode of one cell were short-circuited and the positive electrode potential was measured, it was found to be 0.92 V, that is, less than 2.0 V.

Remaining film type capacitor cells were evaluated according to a method similar to that of the cell 1. Results are shown in Table 7.

TABLE 7

|  | Initial capacitance (F) | Energy density (Wh/L) | capacitance after 2000 hr (F) | Capacitance retention rate (%) |
| --- | --- | --- | --- | --- |
| Comparative Example 2 | 42.9 | 16.3 | 29.8 | 69.5 |

When lithium ion was doped in advance to a negative electrode and/or positive electrode so that a positive electrode potential when the positive electrode and negative electrode are short-circuited may be 2.0 V or less, a capacitor having high energy density could be obtained. In comparative example 2, since a positive electrode active material larger in the capacitance per unit weight than comparative example 1 is used and a filling amount of the positive electrode active material is much, the energy density is higher. On the other hand, although a value of $(C_- \times W_-)/(C_+ \times W_+)$ of comparative example 2 was 2, the capacitance retention rate after 2000 hr of the high temperature voltage application test was 69.5%, that is, very lower than that of the cells of examples.

Accordingly, even when a positive electrode active material high in the capacitance is used, when the endurance is considered important, a value of $(C_- \times W_-)/(C_+ \times W_+)$ is set at 5 or more.

Although the invention was described in detail and with reference to particular embodiments, it is obvious for ones skilled in the art that, without deviating from the spirit and scope of the invention, various modifications and corrections can be applied.

The application is based upon Japanese Patent Application No. 2005-355409, filed on Dec. 28, 2005; the entire contents of which are incorporated herein by reference.

INDUSTRIAL APPLICABILITY

The lithium ion capacitor of the invention, being high in the capacitance and long in the lifetime, is very effective as a driving or auxiliary storage power supply for an electric car or a hybrid electric car. Furthermore, it can be preferably used as well as a driving storage power supply for an electric car or an electric wheelchair, an electric storage device of various kinds of energies such as solar energy or wind-power generation, or a storage power supply for domestic electric appliances.

The invention claimed is:

1. A lithium ion capacitor comprising:
   a positive electrode, a negative electrode, and a non-protonic organic solvent electrolytic solution of a lithium salt as an electrolytic solution,
   wherein a positive electrode active material is a material capable of reversibly doping a lithium ion and/or an anion;
   a negative electrode active material is a material capable of reversibly doping a lithium ion;
   the lithium ion is doped in advance to either one or both of the negative electrode and the positive electrode so that a positive electrode potential after the positive electrode and the negative electrode are short-circuited is 2.0 V (relative to Li/Li$^+$) or less;
   when capacitance per unit weight of the positive electrode is $C_+$(F/g), weight of the positive electrode active material is $W_+$(g), capacitance per unit weight of negative electrode is $C_-$(F/g), and weight of the negative electrode active material is $W_-$(g), a value of $(C_- \times W_-)/(C_+ \times W_+)$ is 6.8 or more and 22.8 or less; and
   the weight of the positive electrode active material is larger than the weight of the negative electrode active material.

2. The lithium ion capacitor according to claim 1, wherein either one or both of the positive electrode and the negative electrode, respectively, are provided with a current collector having a hole penetrating through front and back surfaces thereof; and
   the lithium ion is doped to the negative electrode through an electrochemical contact of the negative electrode and a lithium ion supply source.

3. The lithium ion capacitor according to claim 2, wherein the negative electrode active material has capacitance per unit weight three-times or more that of the positive electrode active material.

4. The lithium ion capacitor according to claim 1, wherein the negative electrode active material has capacitance per unit weight three-times or more that of the positive electrode active material.

\* \* \* \* \*